Figure 1:
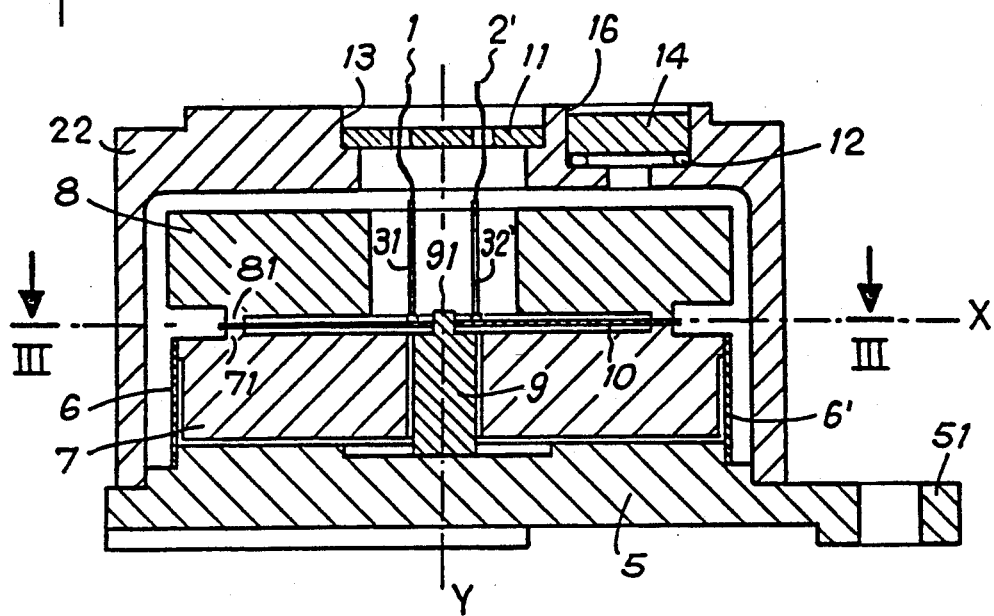

United States Patent [19]
Besson et al.

[11] Patent Number: 5,193,392
[45] Date of Patent: Mar. 16, 1993

[54] PIEZO ELECTRIC RESONATOR DIFFERENTIAL ACCELEROMETER

[75] Inventors: Raymond J. Besson; Roger F. Bourquin; Bernard M. Dulmet; Pierre C. Maitre, all of Besancon, France

[73] Assignee: Etat Francais represented by the Delegue General pour l'Armement, Paris, France

[21] Appl. No.: 639,116

[22] Filed: Jan. 8, 1991

[30] Foreign Application Priority Data

Jan. 11, 1990 [FR] France ................................. 90 00252

[51] Int. Cl.$^5$ ............................................. G01P 15/08
[52] U.S. Cl. ................................................. 73/517 AV
[58] Field of Search ............. 73/497, 517 AV, 862.59; 310/329

[56] References Cited

U.S. PATENT DOCUMENTS 4,144,747  3/1979  Datwyler ......................... 73/862.59
4,258,572  3/1981  Loper .................................... 73/497

Primary Examiner—John E. Chapman
Attorney, Agent, or Firm—Oliff & Berridge

[57] ABSTRACT

A monoaxial differential accelerometer with frequency output, includes a thin monolithic piezoelectric sensitive plate (10) in which plane a sensitive axis (X) is located. The plate (10) comprises two rectilinear slits (15, 15') parallel with the sensitive axis (X) and defining between them two zones of vibration aligned along the sensitive axis (X) and identically sensitive to the temperature variations. Each vibration zone is located between two electrodes (3, 4, 3, 4') to form resonators (20, 21) whose frequency variations are added for an acceleration directed along the sensitive axis (X) and whose the frequency variations are subtracted for an acceleration directed in a plane perpendicular to the sensitive axis (X). The resonators (20, 21) are inserted in the circuits of two oscillators (73, 74) whose beat frequency constitutes the output signal of the differential accelerometer.

10 Claims, 5 Drawing Sheets

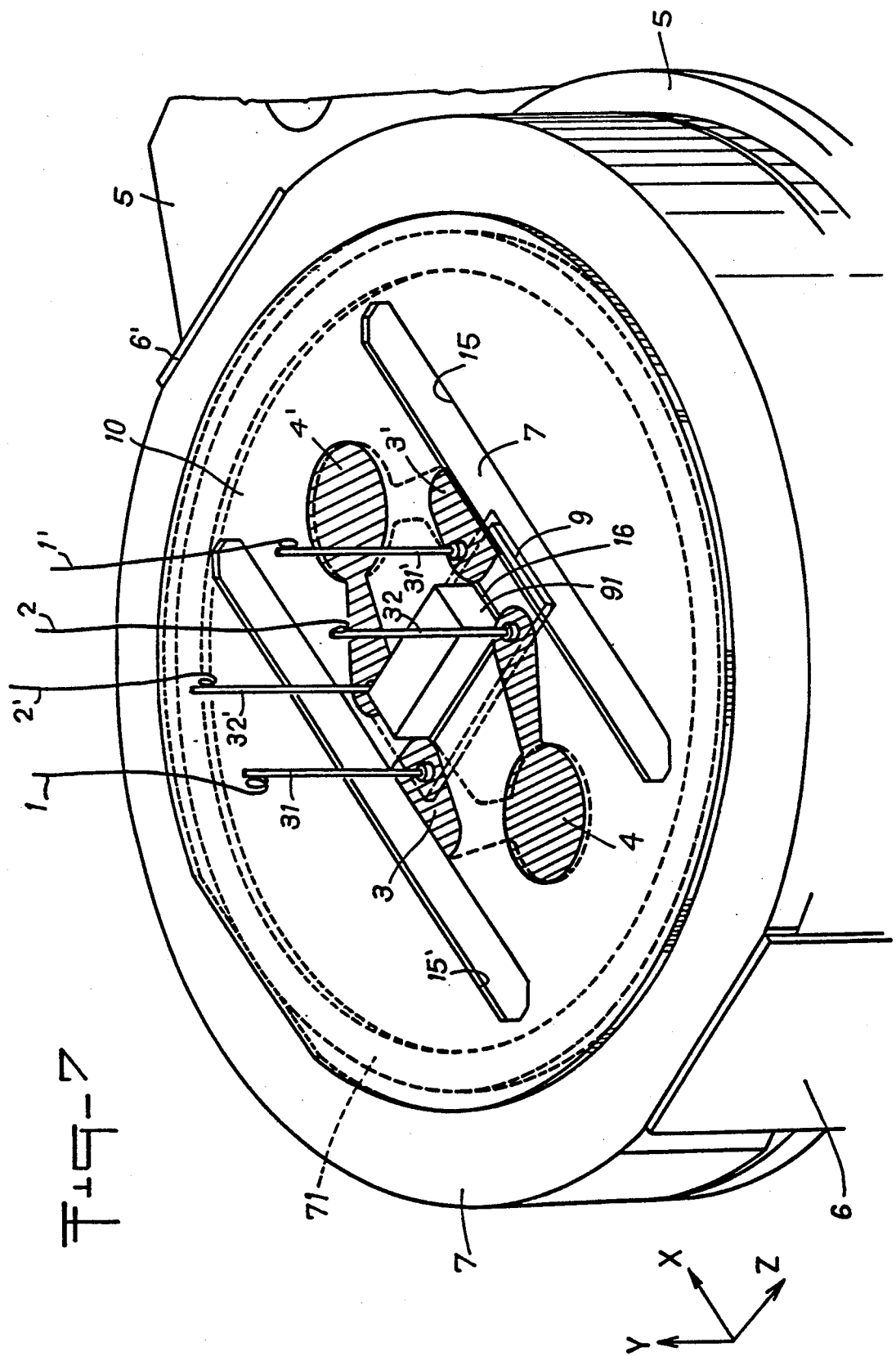

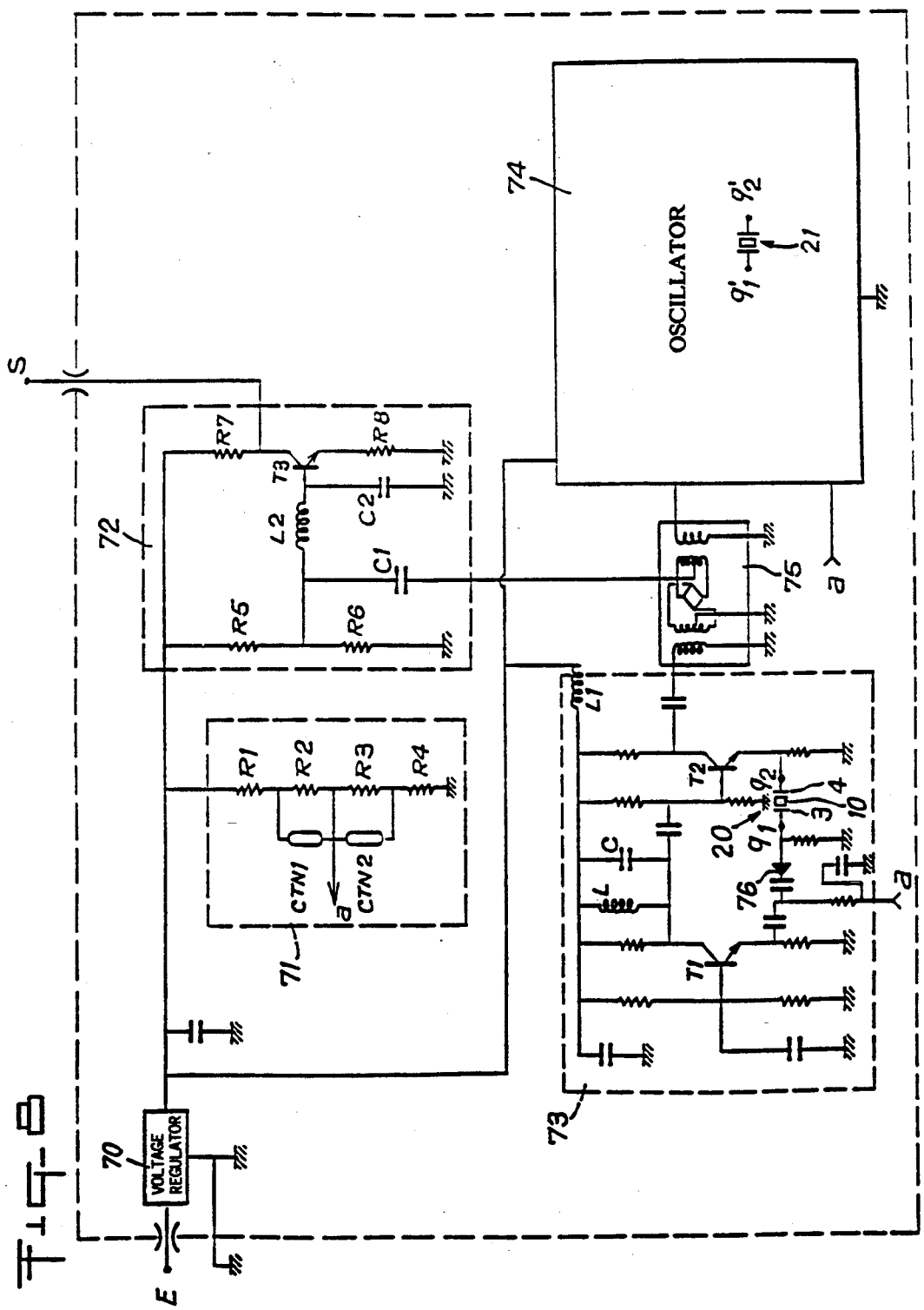

PIEZO ELECTRIC RESONATOR DIFFERENTIAL ACCELEROMETER

The present invention relates to a differential monoaxial accelerometer with frequency output. Among the accelerometers currently used, there are in particular accelerometers with frequency output and accelerometers with voltage output.

In this last type, the voltage output implies, for many applications, the presence of an additional element, for example an analog-to-digital converter following the output to allow processing (digitalization, integration...) of the accelerometer output signal. This type of accelerometer does not allow, in many cases, direct use of the output signal: hence there are relatively high costs of treatment processing and reduced system reliability due to the incorporation of additional elements, such as an analog-to-digital converter, which increases the number of components and thus reduces the system reliability relative to a system having fewer components. A device of this type is described in U.S. Pat. 3,060,748.

As regards the accelerometers with frequency output, the sensitive element is generally a double tuning fork, as in the case of the accelerometer known under the name of "Vibrating Beam Accelerometer", or a filament as in the case of patent WO A 89 105670 or a plate as in U.S. Pat. No. 3,479,536. These elements vibrate in inflection due to compression and tensile stresses.

However, in these examples, the sensitive element can be difficult to realize, and may present problems of temporal stability and sensitivity due to its geometry. Indeed, the sensitive zones are small and isolated from one another thus they can react differently according to the temperature.

The frequency output of the present invention results for the beat frequency of two oscillating circuits. These are determined by the resonance frequency of the vibrating areas on thickness shearing modes. The adoption of such resonance modes enables the invention to cure the disadvantages previously mentioned.

An object of the present invention is to provide an accelerometer In which the resonator thermal sensitivities do not affect its output signal.

Moreover, the invention aims to produce an accelerometer in which the sensitivity is increased selectively along a privileged vibrating axis.

These objectives are reached by an accelerometer of the type described above, that it comprises a thin monolithic piezoelectric sensitive plate in the plane of which a sensitive axis X is located. The plate comprises two rectilinear slits parallel to the sensitive axis X and defining between them two vibrating zones on thickness shearing modes, aligned along the sensitive axis and identically sensitive to the temperature. Each vibrating zone is located between two electrodes to form resonators whose frequency variations are added for an acceleration directed along the sensitive axis and whose frequency variations are subtracted for an acceleration directed in a plane perpendicular to this axis. The resonators are inserted in the circuits of two oscillators whose beat constitutes the output signal of the differential accelerometer.

Advantageously, the accelerometer according to the invention includes first and second seismic masses made integral to of the first and second principal faces of the plate respectively in zones distinct from the vibrating zones.

According to a particular characteristic, the seismic masses are made of a material whose thermal expansion coefficient is the same as the thermal expansion coefficient of the sensitive plate.

According to one embodiment of the invention, the central part of the sensitive plate is fixed rigidly on a supporting means, and the seismic masses are resting against the plate, at the periphery of the plate.

According to another embodiment of the invention, the sensitive plate is fixed rigidly on a supporting means in its peripheral part, and the seismic masses are supported by the central zone of the plate. Preferably, the seismic masses and the sensitive plate are made of quartz.

Advantageously, the accelerometer includes first and second flexible blades arranged in parallel in planes perpendicular to the plane of the sensitive axis X and each one is fixed by one of their ends on a supporting means and by their second end on at least one of the aforesaid seismic masses. The aforementioned flexible bladed are laid out on both sides of the sensitive plate and are used to limit the displacement of the seismic masses in the only direction of the sensitive axis only.

The accelerometer according to the invention can comprise an electronic unit including first and second oscillators associated with each resonator, a voltage control loop, an adjustment circuit of the oscillators thermal sensitivity, a mixer located at the output of the oscillators and a power amplifier circuit whose input receives the mixer output signal.

Figure 2:
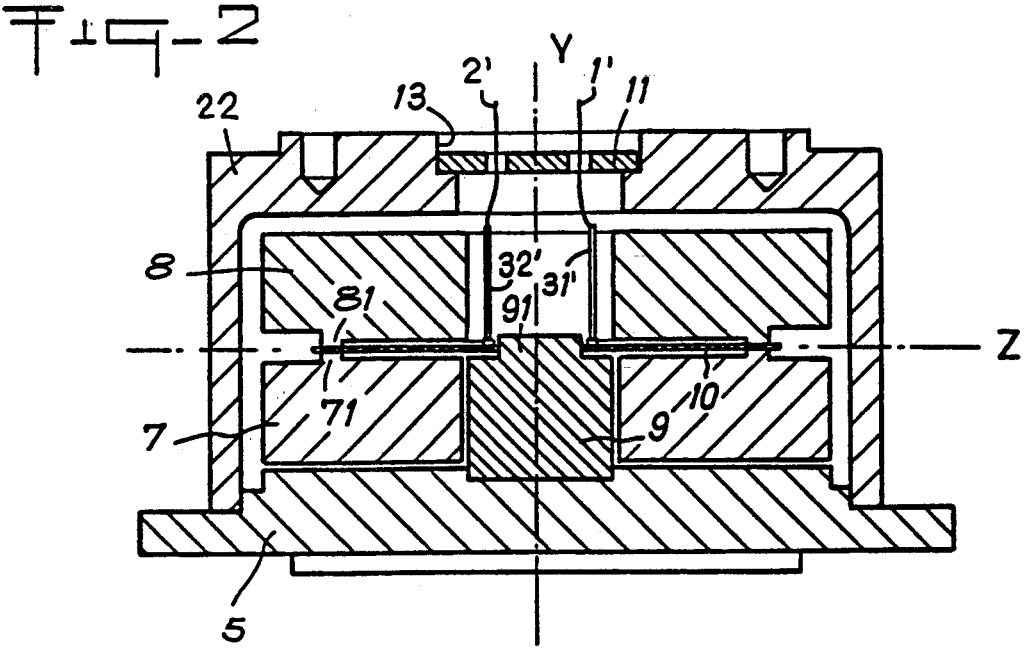
Figure 3:
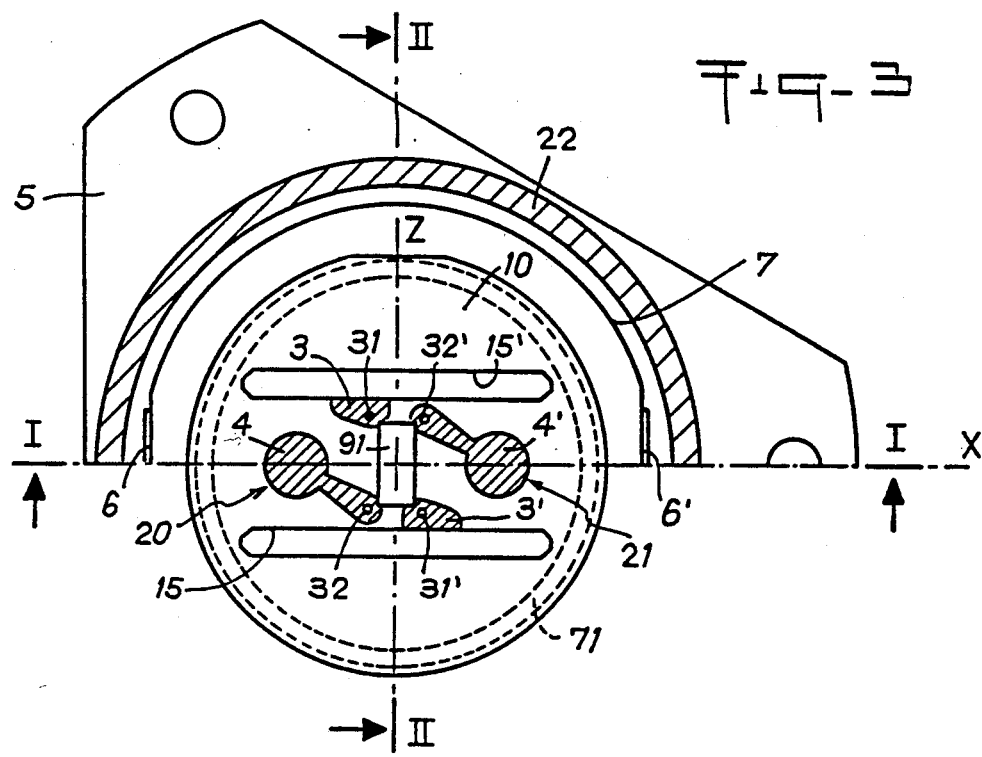
Figure 6:
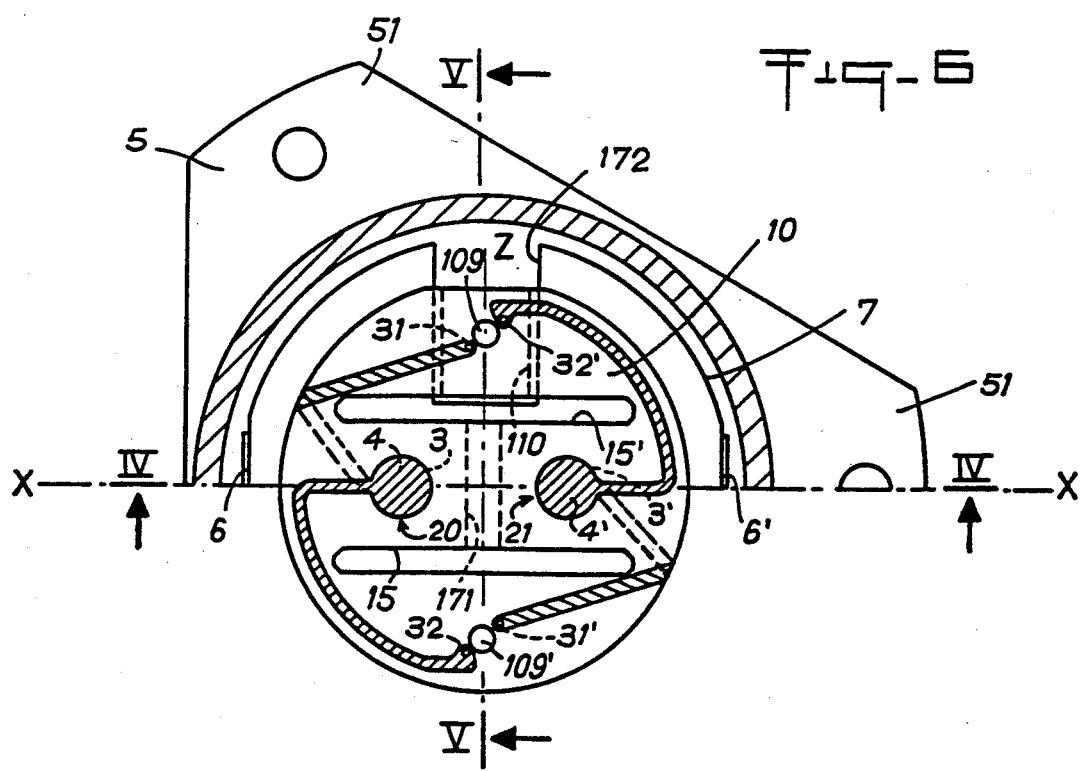
Figure 4:
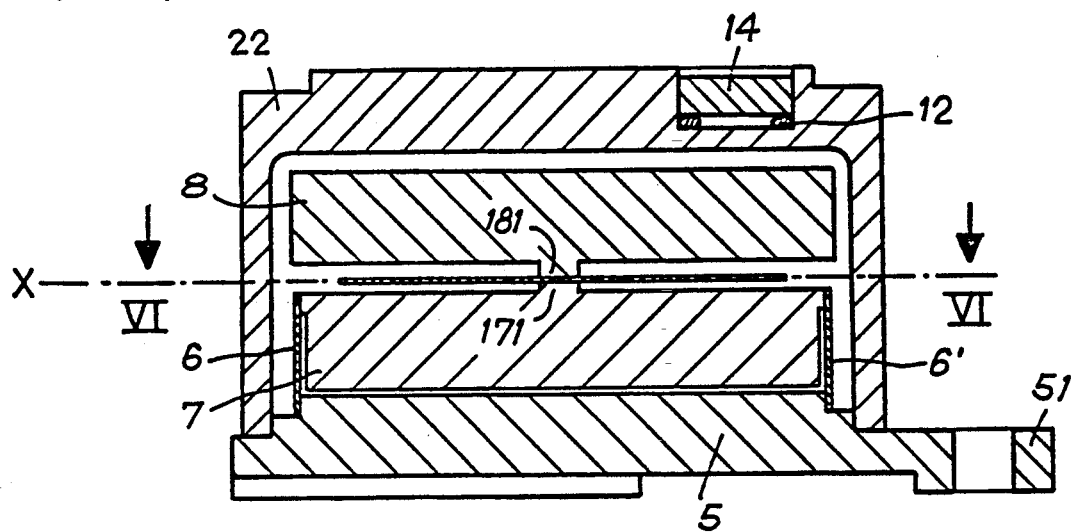
Figure 5:
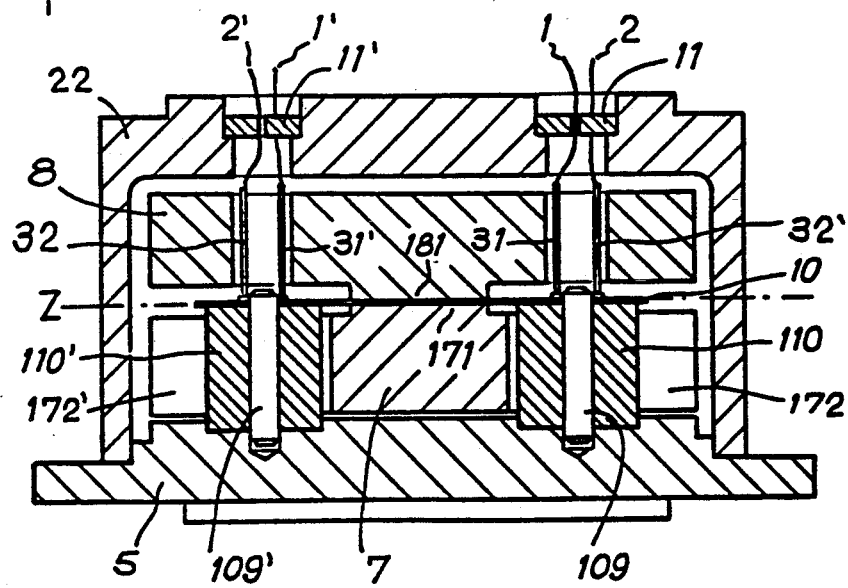

Other characteristics and advantages of this invention will arise better when reading the description which will follow, made in reference to the annexed drawings on which:

FIG. 1 represents a section, according to plane I—I of FIG. 3, of an accelerometer according to a first embodiment of the invention, FIG. 2 is a section of the accelerometer of FIG. 1, according to plane II—II of FIG. 3, FIG. 3 is a partial half-section according to line III—III of FIG. 1, showing moreover all the sensitive plate of the accelerometer in top view, FIG. 4 shows a cross section according to plane IV—IV of FIG. 6 of an accelerometer according to a second embodiment of the invention, FIG. 5 is a section of the accelerometer according to plane V—V of FIG. 6, FIG. 6 is a partial half-section according to line VI—VI of FIG. 4 showing moreover all the sensitive plate of the accelerometer in top view, FIG. 7 is a diagrammatic view in perspective showing part of the accelerometer of FIGS. 1 to 3, and FIG. 8 is an electronic diagram of the circuits used in the accelerometer according to the invention.

FIGS. 1 and 2 respectively represent two perpendicular planes of the sensitive part of an accelerometer according to a first embodiment of the invention.

The sensitive element is a thin section 10 made of a piezoelectric material. The central part of this plate 10 is embedded in the upper part 91 of a foot 9 which is fixed in a base plate 5 provided with tabs or mounting flanges 51. The peripheral part of, the sensitive plate is pinched between two seismic masses 7 and 8 which, in this embodiment, are nearly cylindrical and made of a piezoelectric material such as quartz.

In addition, two pairs of electrodes 3, 4 and 3', 4' are put on the upper and lower principal faces of the sensitive plate 10, and are used to excite the piezoelectric material of the sensitive plate 10 in the acceleration detecting, vibration zones aligned along a sensitive axis X. Each pair of electrodes 3, 4; 3' 4' is associated with one of the vibration zones of plate 10 to form two resonators 20, 21. Electrodes 3, 3' are formed on the lower face of the sensitive plate 10 while electrodes 4, 4' are formed on the upper face of the sensitive plate 10.

The various electrodes 3, 3', 4, 4' are connected by conducting paths to vertical metal stems 31, 31', 32, 32' laid out above the sensitive plate 10 and lengthened by connecting wires 1, 1', 2, 2', for example made of nickel, which present small spirals at their lower end in contact with the conducting stems 31, 31', 32, 32' (FIG. 7) in order to avoid secondary stresses exerted at the level of the conducting stem 31, 31', 32, 32' and thus at the level of the sensitive plate 10. As can be seen on FIG. 7, the metallization returns formed on the edge of the sensitive plate 10 at the level of the rectilinear slits 15, 15' ensure the continuity of the metal paths between the lower electrodes 3, 3' and corresponding connecting stems 31, 31'.

The connecting wires 1, 1', 2, 2' cross an insulating obturating plate 11 of a passage 13 formed at the upper part of cover 22, located on the base plate 5. Cover 22 covers both the sensitive plate 10 and seismic masses 7, 8 while keeping an open space around this sensitive unit 10, 7, 8.

Incidentally, an additional opening 16 can be formed in the upper part of cover 22 to make vacuum inside the chamber defined by cover 22 and base plate 5. A plug 14 and a seal 12 then ensure the obturation of opening 16.

The seismic masses 7, 8 are intended to create stresses in the sensitive plate 10 due to the effect of acceleration. Distinct stresses are created in each resonator 20, 21 so that their vibrating frequency is modified due to the non-linearities of the law of mechanical behavior of the piezoelectric material.

In the embodiment of FIGS. 1 to 3, the seismic masses 7, 8 are in contact with the sensitive plate 10 by a narrow peripheral zone 71, 81. The other zones of the faces of the seismic masses 7, 8 facing the sensitive plate 10 are set back to avoid contacts between plate 10 and the seismic masses 7, 8 outside the peripheral zones 71, 81.

In the example of FIGS. 1 to 3, the electrodes 3, 4, 3', 4' have been represented as being directly located on the sensitive plate 10 in order to define adhering electrode resonators. However, electrodes 3, 4, 3', 4' could also be formed on the faces of the seismic masses located facing the principal faces of the sensitive plate 10 to constitute the two resonators 20, 21 which would be then of the type with non-adhering electrodes.

In the embodiment of FIGS. 1 to 3, the two independent zones defined on the sensitive plate 10 within resonators 20, 21 are kept in vibration due to the piezoelectric effect.

These zones vibrate at high frequencies in thickness shearing, and are isolated from the peripheral zones in contact with parts 71, 81 of the seismic masses by two rectilinear slits 15, 15' located on both sides of the resonators being parallel to the sensitive axis X of the accelerometer which preferably consist of the crystallographic axis X made of quartz.

Insofar as resonators 20, 21 are in the same piezoelectric plate, the orientation compared to the axis of symmetry of the crystals is the same one for each resonator 20, 21. Thus the thermal sensitivities of the resonators are identical and the output signal of the electronic circuit is not disturbed by the variations in temperature.

Thanks to the arrangement adopted for the resonators on the same sensitive plate 10 according to sensitive axis X, the frequency variations of resonators 20, 21 are added for a given orientation of acceleration compared to the plate i.e. for an orientation parallel to the sensitive axis. They are subtracted for an orientation perpendicular to the first orientation according to axis X.

Generally the sensitive axis X of plate 10 remains parallel to the laying plane of base plate 5.

The center of gravity of the seismic masses 7, 8 is advantageously located in the plane of the sensitive plate 10.

Two flexible blades 6, 6', for example made of quartz, are advantageously designed to guide laterally at least one of the seismic masses 7, thus limiting the clearance of the mass in the direction of the sensitive axis. Each flexible blade is fixed on one end on support 5 and on the other end it rests on the seismic mass.

According to a preferred embodiment of the invention all the components previously mentioned are made of quartz except the base plate 5 which can be made of stainless steel for example.

FIGS. 4, 5 and 6 relate to a second embodiment, for which the same elements have the same references as in the first embodiment of FIGS. 1 to 3.

Only the differences with respect to the first embodiment will be discussed here.

This second embodiment differs from the first only in the layout of the seismic masses 7, 8 and by the supporting foot with respect to the sensitive plate. In this embodiment, the contact of the seismic masses 7, 8 on plate 10 is in the center of plate 10 by projecting parts 171, 181 fixed on plate 10, for example by gluing, while the support of plate 10 is made by two feet 110, 110' located near the periphery of plate 10. It should be noted that here the support is two parallelepipeds 110, 110' each of them surrounding a column 109, 109' which extends from plate 10. Vertical conducting stems 31, 32', 31', 32 are fixed as close as possible to each column 109, 109' respectively. Metallization paths ensure the electrical connection between each conducting stem 31, 31', 32, 32' and the associated electrodes 3, 3', 4, 4' superposed to one of the sensitive zones of resonators 20, 21.

The metal stems 31, 32 and 31', 32' and the columns 109, 109' are closely located in a plane perpendicular to the sensitive axis X of plate 10, the said plane containing the plane of symmetry of the central zones 171, 172 supporting the seismic masses 7, 8 on plate 10, and separating the two resonators 20, 21. Moreover, the metal stems 31, 32, 31', 32' and the columns 109, 109' are located outside the rectilinear slits 15, 15' parallel to sensitive axis X, compared with the central zones of plate 10 delimited by the rectilinear slits 15. 15'. The means 109, 110, 109', 110' of the support of plate 10 and the connecting stems 31, 32, 31', 32' cannot thus have a parasitic effect on resonators 20, 21 insofar as they are in contact with the "sleeping" areas of sensitive plate 10.

As in the case of the embodiment of FIGS. 1 to 3, the flexible blades 6, 6' perpendicular to the sensitive axis X can be laid out between at least one of the seismic masses, such as the lower seismic mass 7, and the base plate 5. The lower part of the flexible blades is fixed on base plate 5 near the two opposite ends of the seismic mass 7. The upper part of blades 6, 6' is itself fixed to the seismic mass.

FIG. 8 represents a simplified electronic diagram of the circuits used in the accelerometer according to the invention.

These Circuits use for example a hybrid technology i.e. including components assembled on the surface and components known as "in thick layer". The supply terminal E of all the circuits is connected to an external continuous voltage source, for example +8V. A voltage regulator 70 connected to the supply terminal E and to the mass supplies a regulated voltage for instance, 5 volts, which is applied to all the circuits of FIG. 8. These circuits include the first and second oscillators 73, 74, an adjusting circuit 71 of the oscillator thermal sensitivity, and an amplifier circuit 72, which receives the output signal of the mixing phase 75 connected to the output of the two oscillators 73, 74.

The adjusting circuit of the thermal sensitivity of oscillators 73, 74 includes as an example four resistances in series R1, R2, R3, R4 connected between the controlled supply and the mass and two thermistors (components with negative coefficient of temperature) CTN1, CTN2 mounted in parallel on two intermediate resistances R2, R3 to ensure a thermal compensation. The output of circuit 71 is used to polarize diodes 76 with variable capacity incorporated in oscillators 73, 74.

Each oscillator 73, 74 has the same configuration, thus the components of oscillator 73 only have been represented. The terminals q1, q2 of oscillator 73 are connected to connecting wires 1, 2 to electrodes 3, 4 of resonator 20 while the terminals q'1, q'2 of oscillator 74 are connected to connecting wires 1', 2' to electrodes 3', 4' of resonator 21. The elements included in the oscillators 73, 74 are made in a traditional way starting from two transistors T1, T2, a circuit RLC made from an inductance L and a capacitor C assembled in parallel, from polarization resistors, connecting and decoupling capacitors. An inductance L1 located at the input of the oscillator power supply 73, 74 starting from the voltage regulator 70 provides filtering.

The output of each oscillator 73, 74, enters a mixer 75 of the well known double balanced type, whose output is connected by a connecting capacitor C1 to the input of the amplifier circuit 72 which has a traditional configuration starting from a transistor 73, from polarization resistors R5 to R8, and from a filter made from an inductance L2 and a capacitor C2. The output S of amplifier 72 is the general output of the electronic circuit, and directly delivers the beat frequency of the two oscillators 73 and 74, which constitutes a signal that is easy to manipulate. As a non-restrictive example, the voltage regulator 70 can be a Circuit 7B LO5 of Motorola Company and mixer 75 can be a circuit RBM-01 of Minicircuits Company.

The various electronic circuits of FIG. 8 can be laid out inside a cylindrical stainless steel casing superposed or juxtaposed on the casing comprising cover 22 and base plate 5 inside which the sensitive plate 10 is put.

As an example, the embodiment of FIGS. 1 to 3 in which the embedding of sensitive plate 10 compared to base plate 5 of encapsulation 20, 5 is done in the center, and the integration of the seismic masses 7, 8 with plate 10 is done at the periphery allowing sensitivities included, for example, between 110 and 120 Hz/G with quartz circular seismic masses and resonators with 39.9 MHz 5 harmonic to be obtained, the masses 7, 8 adding up approximately 15 G. The practical realisation of the devices might combine conventional machinings (grinding, correction) and ultrasonic machining. Generally, the dimensions of the sensitive plate 10 are adapted to allow vibrating frequency ranging between 10 and 50 MHz.

We claim:

1. A monoaxial differential accelerometer, comprising:
   a sensitive plate having a first principal face and a second principal face, said sensitive plate having a sensitive axis located within a plane of the sensitive plate, wherein said sensitive plate comprises a thin monolithic piezoelectric material;
   a plurality of seismic masses, resting against said sensitive plate;
   support means for supporting said sensitive plate;
   two rectilinear slits formed in said sensitive plate, said slits being parallel to said sensitive axis;
   a plurality of pairs of electrodes located between said rectilinear slits, wherein each said pair of electrodes defines a vibrating zone on thickness shearing mode, each said vibrating zone is aligned along said sensitive axis and each said vibrating zone is substantially identically sensitive to temperature variations;
   wherein each said vibrating zone defines a resonator wherein frequencies of each resonator are added for an acceleration along said sensitive axis and said frequencies are substracted for an acceleration perpendicular to said sensitive axis;
   a plurality of oscillators wherein each oscillator contains one said resonator, wherein beat frequencies of said resonators define an output signal of the accelerometer.

2. An accelerometer according to claim 1, wherein a first and a second seismic mass are integral to the first and second principal faces of the plate in zones distinct from the vibrating zones.

3. An accelerometer according to claim 2, wherein said seismic masses are made of a material whose thermal expansion coefficient is the same as the thermal expansion coefficient of the sensitive plate.

4. An accelerometer according to claim 2, wherein a central part of the sensitive plate is fixed rigidly on said supporting means and said seismic masses rest against a periphery of the plate.

5. An accelerometer according to claim 1, wherein the sensitive plate is fixed rigidly by a peripheral part on the support means and the seismic masses are supported by a central zone of the plate.

6. An accelerometer according to claim 2, further comprising a first flexible blade and a second flexible blade, each said blade having a first end and a second end, wherein said blades are arranged in parallel on planes perpendicular to the sensitive axis wherein each blade is fixed by attaching said first end to the supporting means and attaching said second end to at least one of the seismic masses, wherein said flexible blades are located on sides of the sensitive plate in a direction parallel to the sensitive axis and are used to limit the displacement of the seismic masses in the direction of the sensitive axis.

7. An accelerometer according to claim 2, wherein the seismic masses, the plate, and optionally the flexible blades are made of quartz.

8. An accelerometer according to claim 2, wherein the seismic masses are cylinder-shaped.

9. An accelerometer according to claim 2, wherein the seismic masses are parallelepiped-shaped.

10. An accelerometer according to claim 1, further comprising an electronic unit including first and second oscillators associated with each resonator a voltage regulating circuit, an adjusting circuit for adjusting the thermal sensitivity of the oscillators, a mixer located at the output of the oscillators, and an amplifying circuit that receives an output signal of the mixer.

* * * * *